March 14, 1939.　　　M. H. TUFT　　　2,150,665
TRACTOR MOUNTED IMPLEMENT
Filed Sept. 2, 1936　　　5 Sheets—Sheet 1

FIG-1

INVENTOR
MILES H. TUFT,
BY
ATTORNEYS.

March 14, 1939.    M. H. TUFT    2,150,665
TRACTOR MOUNTED IMPLEMENT
Filed Sept. 2, 1936    5 Sheets-Sheet 2

INVENTOR
MILES H. TUFT.
BY
ATTORNEYS.

March 14, 1939. M. H. TUFT 2,150,665
TRACTOR MOUNTED IMPLEMENT
Filed Sept. 2, 1936 5 Sheets-Sheet 3

INVENTOR
MILES H. TUFT.
BY
ATTORNEYS.

Patented Mar. 14, 1939

2,150,665

UNITED STATES PATENT OFFICE 2,150,665

TRACTOR MOUNTED IMPLEMENT

Miles H. Tuft, Moline, Ill., assignor to Deere & Company, Moline, Ill., a corporation of Illinois Application September 2, 1936, Serial No. 99,047

24 Claims. (Cl. 97—47)

The present invention relates generally to agricultural implements and more particularly to a tractor mounted cultivator, which is adapted for mounting below and near the forward end of the tractor frame.

In cultivating row crops such as beets, beans, lettuce, and the like, it is necessary to be able to guide the tools very accurately in order that they may approach the crops closely enough to remove the destructive closely growing weeds. This is accomplished by mounting the tools rigidly on the tractor, accurately spaced to accommodate several rows of crops, and by steering the tractor carefully, the tools can be guided to avoid digging the crops, even though there may be irregularities in the rows.

Obviously, therefore, the tools must be mounted so that they are held with great rigidity against lateral movement, so that they will quickly respond to a change in direction of the tractor.

The principal object of the present invention is to provide an improved means for mounting such tools on a tractor to obtain a maximum lateral rigidity but at the same time being light in weight in order to keep the inertia of the implement down to a minimum.

Another requirement of a cultivator of this type is that the tools should all work the soil to a substantially constant depth regardless of irregularities in the surface of the ground, in order to dig all the weeds without undermining the crops. It is therefore a further object of my invention to provide a mounting that is not only laterally rigid, but relatively flexible in a vertical direction, in order to accommodate the tools to irregularities in the ground surface.

Another object is the provision of means by which the depth of soil engagement of the tools may be limited.

A further object is the provision for quickly raising and lowering the tools between operative and inoperative positions.

Still another object is to provide means for conveniently adjusting the position of the soil engaging tools to obtain maximum efficiency of operation.

I will now describe the method of constructing and operating specific embodiments of my invention, reference being had to the accompanying drawings in which:

Figure 6 is a sectional elevation taken along a line 6—6 in Figure 4; and

Figure 1:
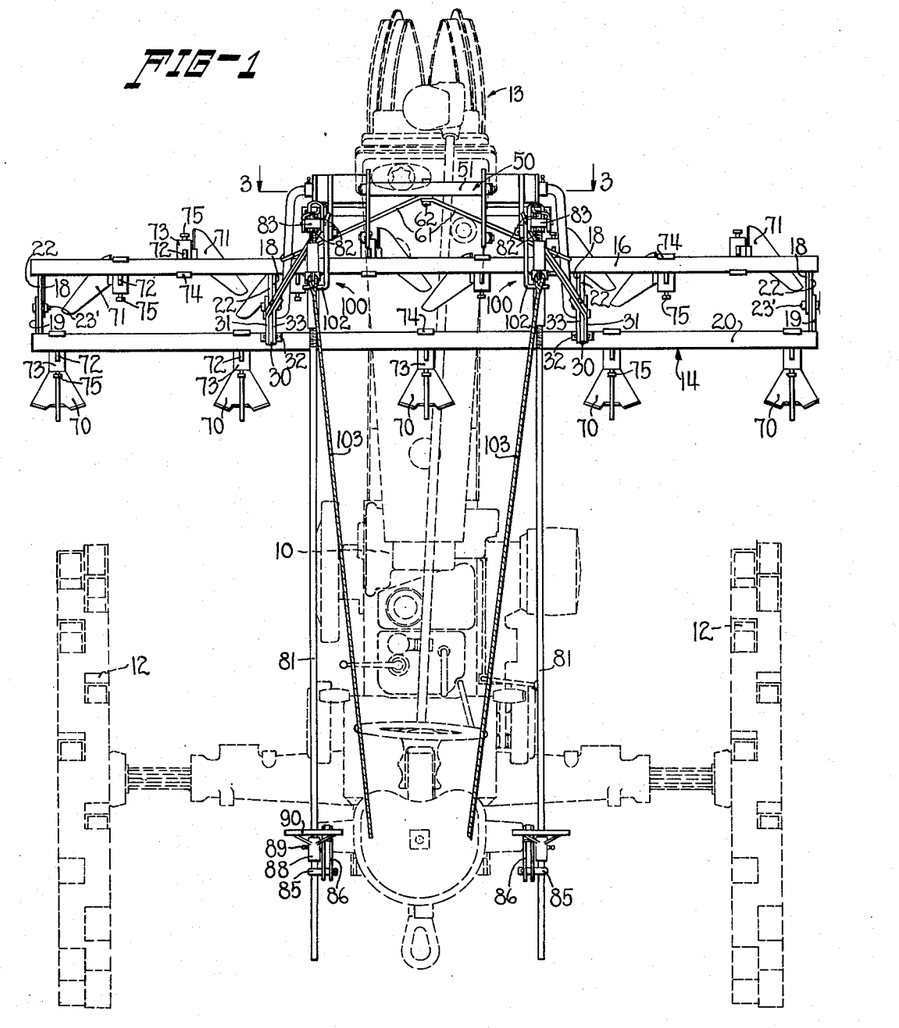
Figure 1 is a plan view of a four row tractor mounted cultivator illustrating one embodiment of the present invention.
Figure 2:
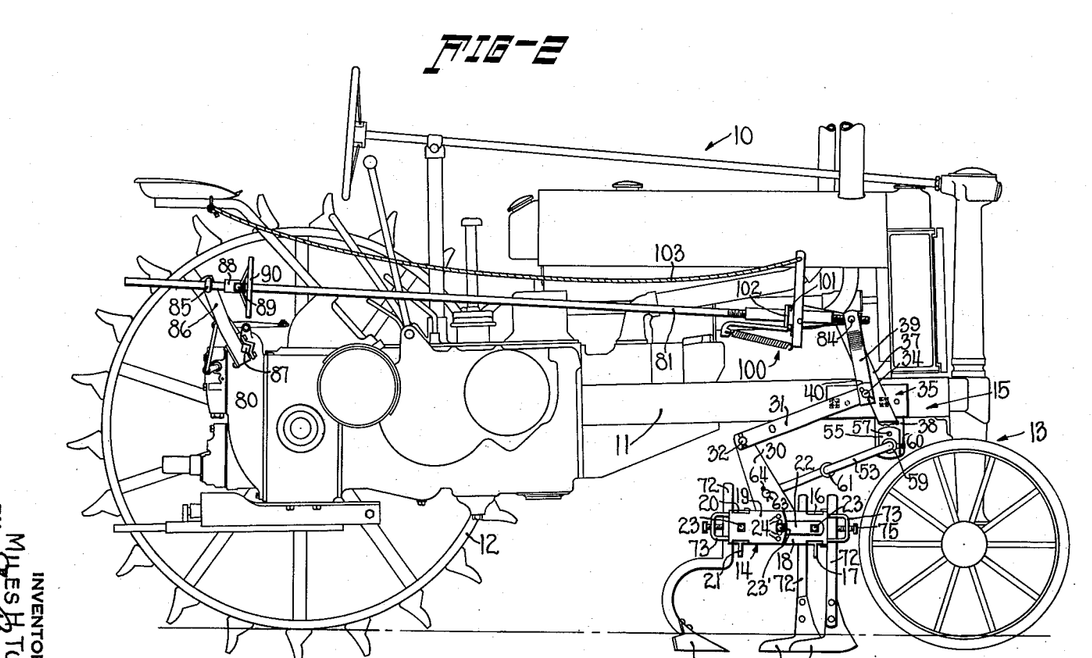
Figure 2 is an elevation of the implement shown in Figure 1.
Figure 3:
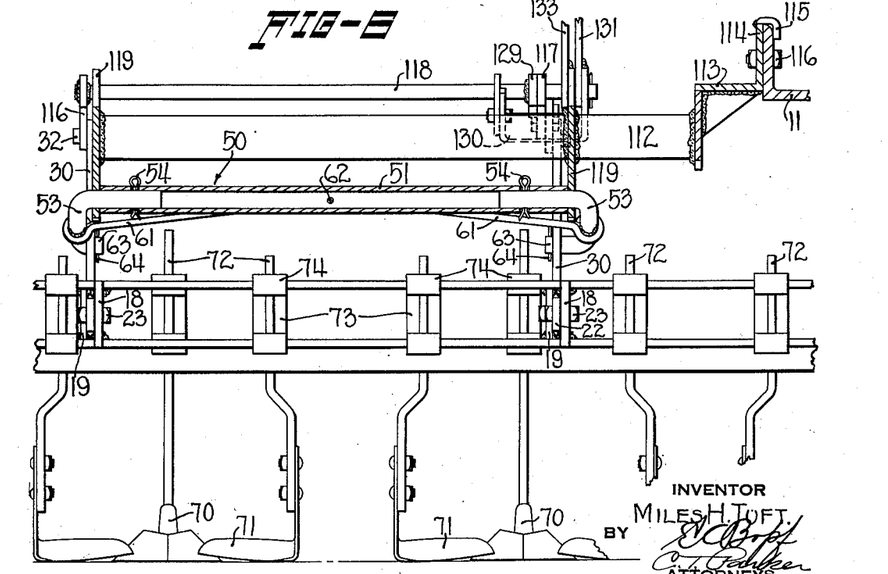
Figure 3 is a sectional elevation taken along a line 3—3 in Figure 1.

Referring to Figures 1 to 3, reference numeral 10 indicates a tractor having a structural frame 11 carried on a pair of rear tractor wheels 12 and a forward dirigible truck 13. The implement attachment comprises a transversely extending tool-carrying frame 14 disposed below and near the front end of the tractor frame 11, immediately behind the forward truck 13, and supporting and lifting mechanism 15 attached to the tractor.

The tool frame 14 includes a forward tool support comprising an upper bar 16 and a lower T-shaped bar 17 welded to opposite edges of rearwardly extending vertically disposed plates 18, which are notched out slightly to receive the bars 16, 17. A similar tool support, disposed parallel to and to the rear of the forward support, is also included in the tool frame 14, and comprises a similar upper bar 20 and lower T-shaped bar 21, welded to forwardly extending vertical plates 19.

The front and rear tool supports are united into a rigid frame by means of tie bars 22 each of which is bolted to one of the forwardly extending plates 19 on the rear support and one of the rearwardly extending plates 18 on the front tool support, by means of bolts 23, the center one of which 23' extends through aligned holes in the bar 22 and both plates 18, 19, which are overlapped for this purpose. A number of other bolt holes 24 are provided in each of the plates 18, 19 and are arranged in an arc about the axis of the other bolt 23 in the respective plate. These extra holes 24 provide for angular adjustments of either of the tool supports independently about the axes of the bolts 23, in which positions of adjustment the frame can be secured rigidly by bolting through one of the other holes 24.

Two of the tie bars 22, one on each side of and adjacent to the tractor frame 11, are provided with upwardly extending plates 30, preferably formed integral therewith. The tool frame is supported by these plates on lifting levers 31, which are pivotally connected thereto by pins 32. The lifting levers 31 are made forked at the outer end by the addition of a parallel extending arm 33 fixed to the lever and pivoted on the pin 32 on the opposite side of the supporting plate 30.

The levers 31 are each journaled on a shaft 34 which is carried on a bracket 35, bolted on the side of the tractor frame 11. As shown in Figure 3, the shaft 34 is welded to the supporting flange 36 of the bracket 35, and has an additional point of support on an upwardly extending leg 37 which is welded to the horizontal web 38 of the bracket 35.

Each of the lifting levers 31 is actuated by means of a crank arm 39 having a U-shaped end 40, journaled on the shaft 34 adjacent to and welded to the lever 31.

By swinging the crank arms 39 on the shafts 34, the tool frame 14 can be raised and lowered. One end of the frame can be moved vertically relative to the other end by swinging one of the cranks relative to the other. Although it is desirable to raise and lower each end of the frame relative to the other, it is necessary that the frame 14 be rigidly held level and prevented from lateral movement. This is accomplished by a double crank member 50 which interconnects the two supporting plates 30 and is journaled on the tractor.

The crank member 50 comprises a pipe 51, in each end of which the bearing portion 52 of a crank arm 53 is journaled, and retained therein by a cotter pin 54, inserted through aligned openings in the bearing portion 52 and the pipe 51. These openings are made oversize to permit a limited amount of rotation of the crank arms 53 relative to the pipe and hence to each other.

The pipe 51 is journaled in a pair of bearing plates 55 which are removably supported on downwardly extending flanges 56 of the brackets 35, respectively, by pins 57, which are fixedly secured in said plates, and are inserted into openings in the flanges 56. To mount the pipe 51 on the brackets 35, it is first raised into downwardly open slots 58 in the flanges 56, and the pins 57 are inserted into the openings in the flanges, whereupon the pipe is then secured against lateral movement relative to the tractor, by collars 59, which are slidably disposed on the crank axles 53. The collars are moved up against the bearing plates 55 and the ends of the pipe 51, and then fixed in that position by set screws 60 (Figure 2) which hold the collars firmly upon the crank axles 53. Thus, the axles 53, while still being free to swing relative to each other, are held against lateral movement. Reinforcing rods 61, having eye portions encircling and welded to the cranks 53 and secured to the pipe 51 at its center point by a bolt 62, aid in holding the cranks rigid against lateral movement but without preventing swinging movement.

The outer ends of the cranks are bent to provide pivot portions 63 to engage openings provided in the supporting arms 30, and are held against lateral movement by cotter pins 64.

Inasmuch as the cranks 53 are equal in length to the lifting levers 31 and disposed parallel thereto, the tool frame 14 is held level in any raised or lowered position. The interconnecting member 50 prevents lateral movement of the tool frame, as described. Hence, a movement of one of the cranks 39 will raise or lower that end of the tool frame 14 relative to the tractor but without disturbing the angle at which the tools engage the soil.

Any suitable ground working tools can be attached to the tool frame but for purposes of illustration, I have shown the frame equipped with cultivator tools of the type used for cultivating beets, beans, lettuce and similar crops. A plurality of shovels 70 are carried on the rear tool support of the frame 14, suitably spaced to travel midway between rows, and weeding knives 71 are carried on the forward tool support. Each of the shovels and knives has a shank 72, which is clamped in upright position to the tool supporting bars by means of a U-shaped clamping member 73 having an outwardly turned ear 74 on each leg. The clamp is inserted between the upper and lower tool supporting bars, such as the upper bar 20 and lower bar 21 of the rear tool support, the ears 74 hooking over the front edges, and the body of the clamp extending rearwardly. The clamp has registering slots (not shown) in its upper and lower legs to receive the shank 72 of a tool. The clamp is then tightly secured by a set screw 75 which is threaded in a tapped hole in the end of the clamp 73 and bears against the tool shank 72 to hold the shank firmly against the upper and lower bars of the tool support, the reaction being taken on the ears 74 on the opposite side of the support. As shown in Figure 1, the tool shanks 72 can be clamped either in front or in back of either of the tool supports, to accommodate different kinds of crops and row spacings.

The tool frame is raised by the power lift mechanism 80 of the tractor by means of a pair of the longitudinally extending rods 81, one on each side of the tractor, pivotally connected to the crank 39 by a pair of lock nuts 82 (Figure 1) on the threaded forward end of the rod 81, engaging a collar 83 which is pivoted at 84 in the bifurcated end of the crank 39. The rods 81 extend rearwardly through eye bolts 85, rotatably mounted in the ends of lifting arms 86 clamped to the power lift rock shaft 87 at either end thereof, respectively. As the shaft 87 is rotated by power from the tractor motor, the eye bolt 85 slides forwardly along the rod 81 until it engages a hub 88 which is fastened to the shaft 81 by a set screw 89. It is clear, therefore, that although the lifting arm 86 engages the rod 81 on the raising stroke, it is free to return to lowered position independently of the rod 81. Hence, the rearward travel of the rod 81 can be stopped at any point by other means, to limit the depth at which the tools operate, but the tools are raised from any operating depth to a constant lifted elevation, regardless of depth adjustment.

The depth of operation is adjusted by means of a depth adjusting mechanism indicated in its entirety by the numeral 100 which is described in detail in my Patent No. 2,133,180, dated October 11, 1938, to which reference is hereby made for a complete description and explanation thereof. For the purpose of the present disclosure it is sufficient to say that the mechanism comprises a collar 101 that is adjustable fore and aft along the shaft, and a stop arm 102, fixed to the upright leg 37 on the bracket 35. The stop arm 102 engages the collar 101 on a rearward movement of the rod 81 thus limiting its travel and hence limiting the depth of operation of the tools. The depth adjustment can be made either by pulling the rope 103 which operates a step-by-step device for rapid and coarse adjustments, or by screwing the stop collar 101 along the rod 81 by rotating the rod by means of the hand wheel 90 on the hub 88, for fine adjustments.

The range of adjustment is from the deepest operating position to the maximum raised or inoperative position, and the depth adjusting mechanism on each side of the tractor is independently adjustable, thus permitting one side of the tool frame to be set for higher operating position than the other.

Inasmuch as there is no restraining force holding the tool frame down, it is free to rise as a unit, or either side independently, due to the effects of changes in ground surface and soil conditions upon the action of the tools in the ground.

Referring now to Figures 4 to 7, inclusive, the six-row cultivator attachment comprises two independent tool frames 110, 111, each of which is supported on a beam or arm 112 extending laterally from each side of the tractor frame 11. The mounting for the beam 112 is shown in detail in Figure 6, and comprises a bracket 113 to which the beam is welded, the bracket having an upwardly extending flange 114, which is bolted to the tractor frame 11. A lug or hook 115, welded to the top of the flange 114, hooks over the tractor frame 11, taking part of the shearing load off the bolts 116 and resisting the moment set up by the weight of the implement when in the raised or inoperative position.

Each of the tool frames 110, 111 has two upwardly extending plates or arms 30 by which they are hung from the respective beam 112 on lifting levers 116, 117. The levers are carried on a rock shaft 118 which is journaled in a pair of spaced supporting plates 119 that are welded to the beam 112. The outer lever 116 is welded to the rock shaft 118 so that it swings when the shaft is rocked. The inner lever 117 is journaled on the rock shaft and is therefore swingable relative thereto.

The inner lever 117 has provision for adjusting the tool frame angularly relative to the arm 112. The lever consists of two juxtaposed members 125, 126 bolted together by three bolts 127, inserted through aligned openings in the members 125, 126. The two outer openings 128 in one of the members 126 are elongated so that with the bolts 127 loose, the two members can be angularly shifted relative to each other, about the center bolt 127 as a pivot, thus raising or lowering the inner end of the tool frame relative to the other.

A stub lever 129 is welded to the rock shaft 118 in juxtaposition to the inner lever 117. A U-shaped lifting bar 130 is hung from the rock shaft 118 on which it is swingable, and extends under the juxtaposed levers 117, 129. This lifting bar is actuated by a crank arm 131 which is swingable on the shaft 118 and welded to the bar 130 and is connected to the operating rod 81 by a swivel block 83 secured by nuts 82 as previously described.

A forward thrust on the lifting crank 131 raises the lifting bar 130 which bears upwardly on the juxtaposed stub lever 129 and lifting lever 117, thereby lifting the inner end of the tool frame by the lever 117 and the outer end of the frame by rotating the rock shaft 118 through the stub lever 129, the rock shaft in turn operating the outer lifting lever 116. Obviously, restraint is applied only in a raising direction by this construction, therefore the two ends of the tool frame are free to rise independently as the frame follows the contour of the ground, the bar 130 limiting only the depth to which the tools can penetrate.

In case it is desired that the tool frame be held against independent movement of its inner and outer ends, the two juxtaposed levers 117, 129 can be bolted together through aligned openings 132 provided for that purpose. The two lifting levers 116, 117 are thus connected together through the rock shaft 118 and the only flexibility between them is that obtained through the torsion of the shaft 118.

The stop member 102 in this embodiment, is carried on an upwardly extending arm 133 that is welded to the inner supporting plate 119. The arm 133 has an opening through which the rock shaft 118 extends and thus provides additional length of bearing surface for the shaft besides the bearing provided by the plate 119.

Each of the tool frames 110, 111 is braced against lateral movement by a bracing member 50, as in the four row cultivator. The pipe member 51 in this case, however, instead of being carried in bearing plates, extends between and abuts the two supporting plates 119. The angularly movable crank arms 53 extend through apertures in the plates which constitute journals. The ends 63 of the arms 53 are turned inwardly and are pivotally secured to the arms 30 on the tool frame by cotter pins 64, which restrain movement of the frame relative to the beam 112.

Figures 4, 7:
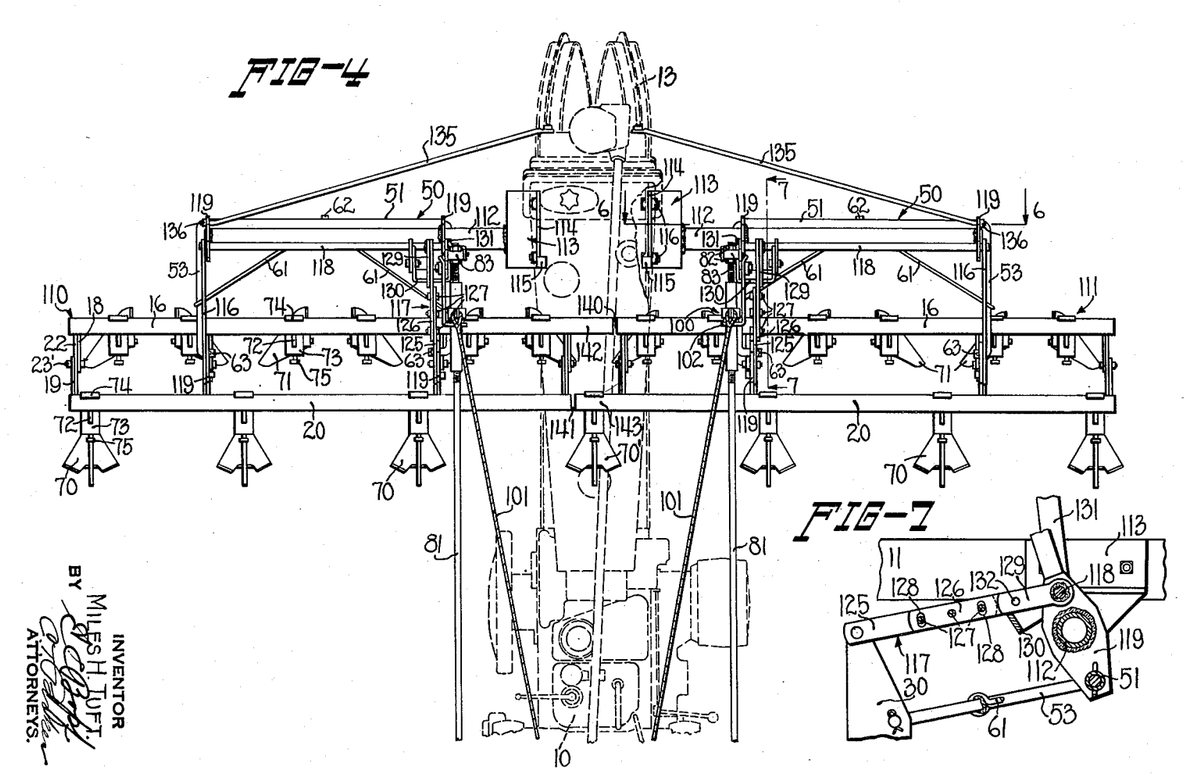
Figure 4 is a plan view of another embodiment illustrated by a six row cultivator.
Figure 7 is a fragmentary view taken along a line 7—7 in Figure 4.
Figure 5:
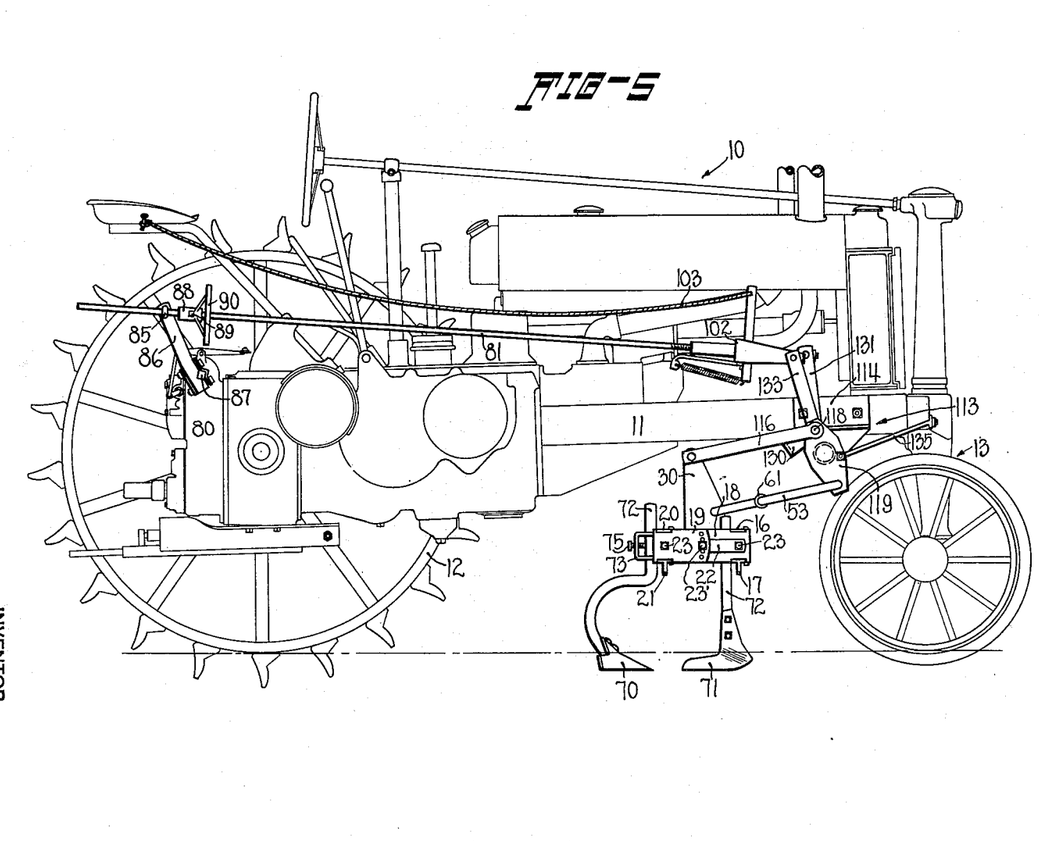
Fig. 5 is a side elevation of the second embodiment.

Diagonal bracing rods 135 extend from the front end of the tractor frame 11 to the outer ends of the beams 112, respectively, for reinforcing the arms against the rearward thrust due to the reaction of the tools in the soil. The outer ends of the rods are threaded and are secured to the outer supporting plates 119 by nuts 136.

The front tool supporting bars 16, 17 of the two frames 110, 111 are aligned transversely and meet at a point 140 that is offset to the right of the center line of the tractor 10. The rear tool supporting bars 20, 21 are similarly aligned but their meeting point 141 is offset to the left of the center line of the tractor. This construction provides an extension 142 on the front tool support of the left hand tool frame, and an extension 143 of the rear tool support of the right hand tool frame, over the center line of the tractor, thus providing for mounting a tool such as 70' directly on the center line of the tractor, to properly cultivate the space in which the front wheel 13 of the tractor runs.

Since the two tool frames 110, 111 are independently supported, it is possible to cultivate with only one tool frame, with the other frame locked up in inoperative position by means of its depth adjusting device 100, which, as was explained, operates over the entire range of lift of the lifting mechanism. With one of the operating rods 81 held in raised position, the eyebolt 85 on the corresponding power lift rock shaft lever 86 merely slides back and forth over the rod 81 when the other frame is being raised by the power lift device 80.

I do not intend my invention to be limited to the details shown and described herein except as set forth in the following claims.

I claim:

1. In combination, a supporting structure, a ground-working tool carrying frame movable relative thereto, actuating mechanism connected to said frame and mounted on said structure, a transversely disposed member journaled on said supporting structure, and a pair of spaced apart bracing arms pivotally connected to said frame and mounted on opposite ends, respectively, of said transverse member.

2. In combination, a supporting structure, a ground-working tool carrying frame movable relative thereto, actuating mechanism connected to said frame and mounted on said structure, a transversely disposed tubular member rotatably mounted on said supporting structure, and a pair of separate spaced apart bracing arms, one end of each of said arms being pivotally connected to said frame, the other ends being turned into opposite ends, respectively, of said tubular member and secured thereto by means permitting a limited amount of angular movement relative to said tubular member and to each other.

3. In combination, a supporting structure, a ground-working tool carrying frame movable vertically relative thereto, a pair of spaced apart lifting levers connected to said frame and pivotally mounted on said supporting structure, and means for bracing said frame against movement in a direction generally perpendicular to the planes of rotation of said levers about their pivots, said bracing means comprising a member having a transverse bearing portion and a pair of cranks mounted at opposite ends thereon, said member being swingably connected to said frame and said supporting structure.

4. In combination, a supporting structure, a ground-working tool carrying frame movable vertically relative thereto, a pair of spaced apart lifting levers connected to said frame and pivotally mounted on said supporting structure, and means for bracing said frame against movement in a direction generally perpendicular to the planes of rotation of said levers about their pivots, said bracing means comprising a member having a transverse bearing portion and a pair of cranks mounted thereon, said member being swingably connected to said frame and said supporting structure, said cranks being angularly movable to a limited extent relative to each other to compensate for variations in the angular relation between said frame and said supporting structure.

5. In combination, a supporting structure, a ground-working tool carrying frame movable vertically relative thereto, a pair of spaced apart lifting levers connected to said frame and pivotally mounted on said supporting structure, and means for bracing said frame against movement in a direction generally perpendicular to the planes of rotation of said levers about their pivots, said bracing means comprising a crank axle journaled on said supporting structure and having a crank arm disposed at each end thereof, each of said arms being substantially equal in length to said lifting levers and parallel thereto, said arms being swingably connected to said tool carrying frame.

6. In combination, a supporting structure, a ground-working tool carrying frame movable vertically relative thereto, a pair of spaced apart lifting levers connected to said frame and pivotally mounted on said supporting structure, and means for bracing said frame against movement in a direction generally perpendicular to the planes of rotation of said levers about their pivots, said bracing means comprising a pipe member journaled on said supporting structure, a pair of crank arms having bearing portions disposed coaxially within each end of said pipe member, respectively, each of said arms being pivotally secured to a portion of said frame, and means for restraining said arms from relative axial movement.

7. A tractor mounted implement comprising in combination a pair of laterally spaced supporting brackets carried by said tractor, a transversely extending tool carrying frame disposed under said tractor and movable vertically relative to said brackets, lifting levers supported on said brackets and connected to said frame, and bracing means comprising a transversely extending pipe member supported on said brackets and a pair of crank arms, corresponding ends of said arms being turned into opposite ends of said pipe member, respectively, and the opposite ends of said arms being connected to said frame, for restraining said tool frame from lateral movement relative to said tractor.

8. A tractor mounted implement comprising in combination a pair of brackets adapted for attachment on either side of the tractor, respectively, adjacent the front end thereof, a transversely extending tool carrying frame disposed under said tractor between the front and rear carrying wheels thereof and movable vertically relative to said brackets, bracing means including a shaft extending between and journaled in said brackets and having a crank arm at each end thereof pivotally connected to said frame, and means for preventing lateral movement of said bracing means relative to said brackets and to said frame for restraining the tool frame from lateral movement relative to said tractor.

9. In combination with a tractor including a frame supported on front and rear carrying wheels, an implement comprising in combination, a supporting arm adapted for attachment adjacent the front end of said tractor to extend laterally from one side thereof, lifting mechanism operatively mounted on said arm, a ground working tool-carrying frame disposed rearwardly of said arm and adapted to extend transversely beneath said tractor between said front and rear carrying wheels, said frome being mounted on said lifting mechanism and movable vertically relative to said arm, a bracing member connected to said frame, and means for supporting said member on said arm whereby said member is rotatable about an axis parallel to said arm but is restrained from axial movement relative thereto.

10. In combination with a tractor having a frame, a laterally extending supporting beam fixed to said frame, a tool-carrying frame disposed below said tractor frame and extending transversely to the line of advance, a pair of upwardly extending lifting plates attached to said frame in spaced apart relation, a pair of lifting levers connected to said plates, respectively, and swingable on said beam in longitudinal vertical planes for moving said tool frame vertically relative to the tractor, means interconnecting said levers for swinging the latter simultaneously, said interconnecting means permitting a limited relative angular movement of said levers, and a transversely extending bracing member, rotatably mounted on said beam and connected to each of said plates, for restraining said levers from movement out of their respective planes while permitting said limited relative angular movement of said levers.

11. In combination with a tractor having a frame, laterally extending supporting beams fixed on opposite sides of said frame, respectively, transversely extending tool frames disposed below said tractor frame, a pair of lifting levers swingably mounted on each of said supporting beams and operatively connected to said tool frames for raising and lowering the latter relative to said supporting beams, means for swinging each of said pairs of levers simultaneously to lift their respective tool frames, said means permitting relative angular movement between the levers of each pair, and bracing members connecting said frames with said beams to prevent lateral movement of said tool frames relative to said tractor.

12. In combination with a tractor having a frame, laterally extending supporting arms fixed on opposite sides of said frame, respectively, a transversely extending tool carrying frame disposed below said tractor frame, said tool carrying frame comprising fore and aft tool bars and means for connecting said tool bars in spaced parallel relation, said connecting means including means for adjusting the angular relation between said tool bars, and lifting levers swingably supported from said arms and connected to said tool frame for operatively raising and lowering the latter.

13. In combination with a tractor having a frame, laterally extending supporting arms fixed on opposite sides of said frame, respectively, a transversely extending tool-carrying frame disposed below said tractor frame, said tool carrying frame comprising two aligned but relatively movable sections, each of said sections comprising fore and aft tool bars and means for connecting said tool bars in spaced parallel relation, said connecting means including means for adjusting the angular relation between said tool bars, and lifting levers swingably supported from said arms and connected to said tool frame for operatively raising and lowering the latter.

14. In a tractor mounted implement, a supporting structure, a tool carrying frame moveable vertically relative thereto, said frame being divided into two normally aligned sections, the line of division between said sections being spaced from the center line of said frame, and means for moving said sections vertically relative to said structure, independently of each other.

15. In an implement, front and rear tool carrying bars disposed in spaced parallel relation and means for connecting said bars to form an elongated tool frame, said frame being divided into two relatively movable sections, the lines of division of said front and rear bars being offset on opposite sides, respectively, of the fore and aft extending center line of said frame.

16. In an implement, front and rear tool carrying bars disposed in spaced parallel relation and means for connecting said bars to form an elongated tool carrying frame, said connecting means including means for adjusting said bars angularly about longitudinal axes relative to each other.

17. In an implement, the combination of a supporting structure, a ground working tool carrying frame movable relative thereto, a pair of spaced apart actuating levers mounted on said structure and connected to said frame for moving the latter, said levers being free to move independently of each other to accommodate movement of one end of said frame relative to the other end, and means for actuating both of said levers simultaneously to move said levers as a unit.

18. In an implement, the combination of a supporting structure, a ground working tool carrying frame movable vertically relative thereto, a pair of spaced apart lifting levers swingably mounted on said structure and connected to said frame, said levers being free to move independently of each other to permit one end of the frame to raise and lower independently of the other as the frame operates on ground of irregular surface, and means for actuating both of said levers simultaneously to adjust the lower limit at which the frame can operate and to raise the frame to an inoperative position.

19. In an implement, the combination of a supporting structure, a ground working tool carrying frame movable vertically relative thereto, a shaft mounted on journals on said supporting structure, a pair of spaced apart lifting levers mounted on said shaft and connected to said frame, one of said levers being fixed to said shaft and the other being swingable thereon, a member fixed to said shaft adjacent to said swingable lever, and an actuating lever journaled on said shaft, said actuating lever having means for engaging said fixed member and said swingable lever for exerting a lifting force on both levers simultaneously but without restraining upward movement of said frame relative to said structure.

20. In an implement, the combination of a supporting structure, a ground working tool carrying frame movable relative thereto, a pair of spaced apart actuating levers mounted on said structure and connected to said frame for moving the latter, said levers being free to move independently of each other to accommodate movement of one end of said frame relative to the other end, a bracing arm associated with each of said levers and disposed parallel thereto, said arms being substantially equal in length to said levers and parallel thereto, and pipe means connecting said bracing arms, corresponding ends of said arms being turned into opposite ends of said pipe means, respectively, there being aligned apertures in said arms and said pipe means, and pins inserted through said apertures, said pins being smaller than said apertures, whereby said pins are adapted to restrain said arms from lateral movement relative to each other but permitting limited relative angular movement.

21. The combination with a tractor having a body supported on front and rear wheels, of an implement comprising a pair of brackets adapted to be attached to either side, respectively, of said body, near the forward end thereof, a tool carrying frame extending transversely under the tractor body between said front and rear wheels and movable vertically relative to said brackets, and bracing means comprising a shaft disposed transversely beneath the tractor and journaled in said brackets, said shaft having a crank arm disposed at each end thereof pivotally connected to said frame, and means for preventing lateral movement of said bracing means relative to said brackets and to said frame.

22. The combination with a tractor having a body supported on front and rear wheels, of an implement comprising a pair of brackets adapted to be attached to either side, respectively, of said body near the forward end thereof, a tool carrying frame extending transversely under the tractor body between said front and rear wheels and movable vertically relative to said brackets, a lifting arm mounted on each of said brackets for swinging movement in a vertical plane and pivotally connected to said frame, and means for bracing said frame against lateral movement relative to said tractor and against fore and aft rocking movement, comprising a shaft disposed transversely beneath the tractor body and journaled in said brackets, a pair of crank arms mounted on said shaft at opposite ends thereof, respectively, and pivotally connected to said frame, said crank arms being disposed parallel to said lifting arms and equal in length thereto, and means for preventing lateral movement of said bracing means relative to said brackets and to said frame.

23. In combination with a tractor having a frame, a laterally extending supporting beam fixed to said frame, a tool carrying frame disposed below said tractor frame and extending transversely to the line of advance, a pair of laterally spaced brackets fixed to said beam, a pair of lifting levers pivotally connected at one end thereof to said brackets, respectively, and at the other ends to said frame, and means for bracing said frame against lateral movement relative to said tractor frame comprising a shaft disposed parallel to the axis of said supporting beam and journaled in said brackets, said shaft having a crank arm disposed at each end thereof pivotally connected to said frame, and means for preventing lateral movement of said bracing means relative to said brackets and to said frame.

24. In combination with a tractor having a frame, a laterally extending supporting beam fixed to said frame, a tool carrying frame disposed below said tractor frame and extending transversely to the line of advance, a pair of laterally spaced brackets fixed to said beam, a pair of lifting levers pivotally connected at one end thereof to said brackets, respectively, and at the other ends to said frame, and means for bracing said frame against lateral movement relative to said tractor frame and against fore and aft rocking movement, comprising a shaft disposed parallel to the axis of said supporting beam and journaled in said brackets, a pair of crank arms mounted on said shaft at opposite ends thereof, respectively, and pivotally connected to said frame, said crank arms being disposed parallel to said lifting arms and equal in length thereto, and means for preventing lateral movement of said bracing means relative to said brackets and to said frame.

MILES H. TUFT.